F. W. RICE.
MANURE SPREADER.
APPLICATION FILED JUNE 6, 1910.
995,905.
Patented June 20, 1911.
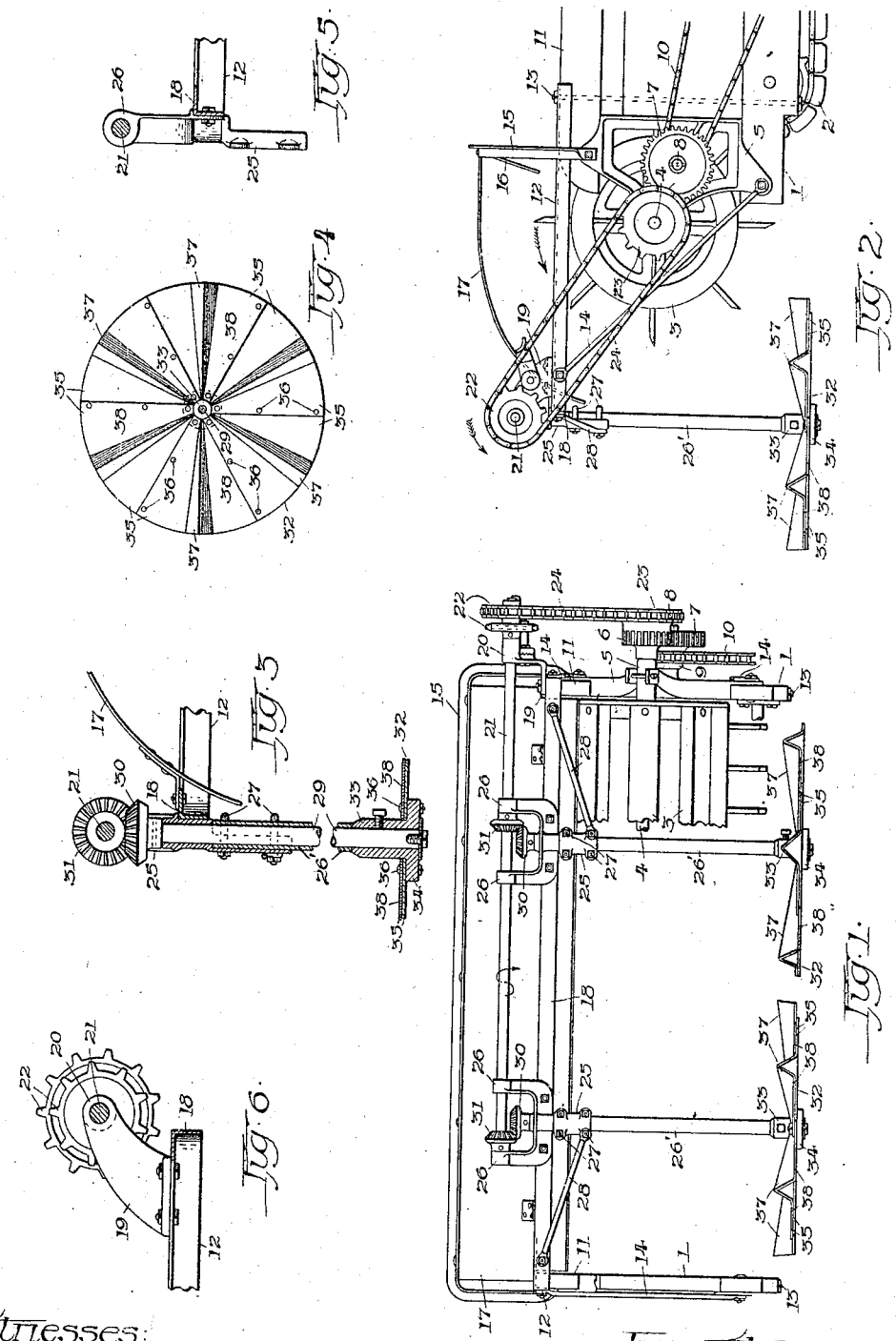

UNITED STATES PATENT OFFICE.

FRANK W. RICE, OF SPRINGFIELD, OHIO, ASSIGNOR TO INTERNATIONAL HARVESTER COMPANY, A CORPORATION OF NEW JERSEY.

MANURE-SPREADER.

995,905. Specification of Letters Patent. Patented June 20, 1911.

Application filed June 6, 1910. Serial No. 565,193.

*To all whom it may concern:*

Be it known that I, FRANK W. RICE, a citizen of the United States, residing at Springfield, in the county of Clark and State of Ohio, have invented certain new and useful Improvements in Manure-Spreaders, of which the following is a specification.

My invention relates to manure spreaders of the type having a distributing cylinder located at the rear end of the receptacle, its object being to provide a supplemental distributing mechanism adapted to receive the material from the cylinder and operative to widen the path of its distribution upon the ground. I attain these objects by means of the mechanism illustrated by the accompanying drawing, in which—

Figure 1 represents a rear view of the distributing end of a manure spreader, having my invention forming a part thereof; Fig. 2 is a side elevation of Fig. 1; Fig. 3 is a longitudinal vertical section of part of the supplemental distributing mechanism; Fig. 4 is a top plan view of one of the supplemental distributers; Fig. 5 is a detail of one of the supporting brackets forming part of the supplemental distributing mechanism; and Fig. 6 is a detail of part of the motion transmitting mechanism connected with the supplemental distributer.

The same reference numerals designate like parts throughout the several views.

1 represents the sides of the receptacle, 2 a movable bottom adapted to advance the material toward the distributing cylinder 3 mounted upon a shaft 4 having bearings 5 upon opposite sides of the receptacle, one of the bearings only being shown, the shaft deriving motion in a common way by means of a pinion 6 secured to the shaft and meshing with an intermediate pinion 7 journaled upon a stud 8 and having integral therewith a sprocket wheel 9, which is connected by means of a chain 10 with one of the traction wheels, not shown. The sides of the receptacle include top rails 11, and 12 represents frame members having their forward ends secured to the rails by means of bolts 13 and their outer ends sustained by means of brace members 14, and 15 represents an arched frame member having its opposite ends secured to the side rails and having a depending shield 16 secured thereto that operates to regulate the flow of material to the distributing cylinder, and 17 represents a curved hood located above the cylinder and having its forward edge secured to the frame member 15 and operative to guide the material in a downward direction, the rear edge of the hood being connected with a transverse frame member 18 secured to the rear ends of members 12.

19 represents a bracket secured to the rear end of one of the members 12 and having a bearing box 20, in which is journaled one end of a transverse shaft 21, having sprocket wheels 22 of variable diameter secured thereto, a sprocket wheel 23 being secured to the end of shaft 4 and adapted to be connected with either of the wheels 22 by means of a chain 24 for the purpose of giving a greater or less speed to the shaft 21.

25 represents brackets secured to frame member 18 and having bearings 26 in which shaft 21 is journaled.

$26^1$ represents vertically arranged sleeves having their upper ends secured to the brackets 25 by means of U-bolts 27, and 28 represents laterally extending brace members connected with the bracket and frame member 18.

29 represents shafts journaled in the sleeves $26^1$ and having secured to their upper ends bevel pinions 30 that mesh with corresponding pinions 31 secured to the shaft 21 in a manner to rotate the shafts 29 in an opposite direction.

32 represents supplemental distributers secured to the lower ends of the shafts and rotatable in horizontal planes. The supplemental distributers include a central hub portion 33 having an annular flange 34 at its lower end, to which are secured a series of radially extending plates 35, having their edges overlapped and secured together by means of rivets 36 forming disk members, each plate being provided with a centrally arranged rib 37 having outwardly diverging sides and an outwardly and upwardly inclined upper edge, the series of ribs forming with the plates intervening channels 38 of increasing depth, having substantially horizontal surfaces of increasing width from the center to the periphery of the disk.

In operation the distributing cylinder 3 receives the material in the usual way from the movable bottom and thrusts it upward and rearward against the hood 17, then drives it downward upon the supplemental distributers 32, that rotate in inward and opposite directions at their forward edges in a manner to distribute the material over a wider area.

What I claim as my invention, and desire to secure by Letters Patent, is:

A manure spreader including, in combination, a receptacle, said receptacle including top rails upon opposite sides thereof, a distributing cylinder at one end thereof and adapted to receive the material therefrom and distribute it in a path having a predetermined width, frame bars secured to the top rails of said receptacle and projecting beyond said cylinder, a transverse bar secured to the outer ends of said frame bars, brackets secured to said transverse bar, a transverse shaft journaled in bearings carried by said brackets, vertically arranged shafts journaled in bearings carried by said brackets and geared with said transverse shaft in a manner to rotate in opposite directions, and spreading elements secured to the lower ends of said shafts and adapted to receive the material from said cylinder and distribute it in a path having a greater width than that produced by said cylinder.

FRANK W. RICE.

Witnesses:
H. J. GUYTON,
G. W. RUSSELL.